United States Patent
Pavageau et al.

(10) Patent No.: US 9,680,242 B2
(45) Date of Patent: Jun. 13, 2017

(54) FLAP FOR TERMINAL

(71) Applicant: COMPAGNIE INDUSTRIELLE ET FINANCIERE D'INGENIERIE "INGENICO", Paris (FR)

(72) Inventors: Stephane Pavageau, La Roche de Glun (FR); Cyril Janot, Grane (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/648,857

(22) PCT Filed: Nov. 29, 2013

(86) PCT No.: PCT/EP2013/075170
§ 371 (c)(1),
(2) Date: Jun. 1, 2015

(87) PCT Pub. No.: WO2014/083185
PCT Pub. Date: Jun. 5, 2014

(65) Prior Publication Data
US 2015/0340780 A1    Nov. 26, 2015

(30) Foreign Application Priority Data
Nov. 30, 2012 (FR) .................................. 12 61477

(51) Int. Cl.
*H01R 4/50* (2006.01)
*H01R 12/70* (2011.01)
(Continued)

(52) U.S. Cl.
CPC ....... *H01R 12/7076* (2013.01); *G06K 7/0073* (2013.01); *G06K 13/085* (2013.01); *H01R 13/639* (2013.01)

(58) Field of Classification Search
CPC .. G06K 13/085; G06K 7/0073; H01R 13/639; H01R 12/7076
(Continued)

(56) References Cited

U.S. PATENT DOCUMENTS 5,337,220 A * 8/1994 Granitz .................. G06F 1/184
174/359
5,661,634 A * 8/1997 Obata .................. G06F 1/1626
361/679.02

(Continued)

FOREIGN PATENT DOCUMENTS

DE    3822848 A1    1/1990
EP    1326194 A2    7/2003

OTHER PUBLICATIONS

International Search Report dated Feb. 4, 2014 for corresponding International Application No. PCT/EP2013/075170, filed Nov. 29, 2013.

(Continued)

*Primary Examiner* — Abdullah Riyami
*Assistant Examiner* — Nelson R Burgos-Guntin
(74) *Attorney, Agent, or Firm* — David D. Brush; Westman, Champlin & Koehler, P.A.

(57) ABSTRACT

A flap is provided for closing off a cavity of a terminal, which includes a memory card reader. The flap includes at least one slot for inserting a memory card, and the slot is obtained by a difference in height between a base plane and an insertion plane, and the slot has a guiding profile.

10 Claims, 5 Drawing Sheets

(51) Int. Cl.
  *H01R 13/639* (2006.01)
  *G06K 7/00* (2006.01)
  *G06K 13/08* (2006.01)

(58) Field of Classification Search
  USPC .............. 439/327, 326, 607.14, 62, 73, 89
  See application file for complete search history.

(56) References Cited

U.S. PATENT DOCUMENTS

| | | | | |
|---|---|---|---|---|
| 5,894,597 | A * | 4/1999 | Schwartz | G06K 7/0021 235/441 |
| 5,933,328 | A * | 8/1999 | Wallace | G06K 13/0862 257/678 |
| 6,510,057 | B2 * | 1/2003 | Yap | G06F 1/1656 257/99 |
| 6,724,618 | B1 * | 4/2004 | Jenkins | G06F 1/1626 361/679.32 |
| 6,766,952 | B2 * | 7/2004 | Luu | G06K 7/0034 235/451 |
| 7,136,291 | B2 * | 11/2006 | Tu | H01M 2/1066 361/755 |
| 8,405,972 | B2 * | 3/2013 | Zhang | G06F 1/185 312/223.1 |
| 2002/0149915 | A1 | 10/2002 | Yap et al. | |
| 2011/0151700 | A1 * | 6/2011 | Shen | H01R 12/83 439/326 |
| 2013/0233924 | A1 * | 9/2013 | Burns | G06K 7/0021 235/441 |
| 2014/0308823 | A1 * | 10/2014 | Pavageau | G06F 21/86 439/62 |
| 2015/0171559 | A1 * | 6/2015 | Pavageau | H01R 13/6485 439/89 |
| 2015/0263459 | A1 * | 9/2015 | Pavageau | H01R 13/6585 439/607.14 |
| 2015/0295400 | A1 * | 10/2015 | Pavageau | G06K 7/0056 361/56 |
| 2015/0327694 | A1 * | 11/2015 | Andre | H04M 1/0216 312/326 |
| 2015/0340780 | A1 * | 11/2015 | Pavageau | G06K 7/0073 439/327 |

OTHER PUBLICATIONS

English translation of the Written Opinion dated May 31, 2015 for corresponding International Application No. PCT/EP2013/075170, filed Nov. 29, 2013.

* cited by examiner

FLAP FOR TERMINAL

1. CROSS-REFERENCE TO RELATED APPLICATIONS

This Application is a Section 371 National Stage Application of International Application No. PCT/EP2013/075170, filed Nov. 29, 2013, the content of which is incorporated herein by reference in its entirety, and published as WO 2014/083185 on Jun. 5, 2014, not in English.

2. FIELD OF THE INVENTION

The invention relates to a terminal provided with several memory card readers. The invention relates more particularly to a terminal provided with a professional person's memory card reader and a user's memory card reader. The invention relates more particularly to a system intended to enable the insertion and withdrawal of a professional memory card in a terminal comprising the two types of readers mentioned here above.

3. PRIOR ART

There are known terminals in the prior art that have two smartcard readers. These are for example terminals for medical use. A terminal of this type comprises for example a memory card reader to receive a card related to a patient and a memory card reader to receive a card related to a healthcare professional (such as a doctor or a pharmacist). These two types of cards do not have the same use: the professional card linked to the healthcare professional contains data associated with a profession or with permitted actions while the patient's card enables him or her to be identified.

On the same basis, bank payment terminals can also be provided with two memory card readers: a first reader for receiving a payment card associated with a customer while a second reader receives a professional identification card related to the merchant.

There can be other situations where two card readers are present and the above two examples are provided only by way of illustrations.

However, these situations share the following characteristics: the professional card used by the professional (the doctor, the merchant, etc) is often permanently connected to the terminal in question. Thus, for example, the merchant's card is inserted into the terminal in a prolonged way (it is indeed hard to imagine that the merchant would insert his card whenever a customer has to make a payment). On the contrary the customer's card is inserted into the terminal for the time during which the payment transaction is made.

Thus, to allow for these two types of use of cards, two different systems are employed: the first system, which is very conventional, enables the easy insertion and removal of the card in a memory card reader (smartcard reader, magnetic tape card reader, contactless card reader). This first system is intended for the patient, the customer, in other words the user of the service.

In the second system, the professional person's card is kept permanently in the terminal. To this end, in the prior art, the card is inserted into the reader and blocked in the terminal, for example under a flap situated for example beneath the reader (the rear face of the reader). Thus, the card is inserted for a prolonged period without the service user being simply able to discreetly carry out the fraudulent removal of this professional card. Indeed, a professional card often has extremely sensitive data and the theft of such a card can have disastrous effects. It is therefore by design that terminal manufacturers have hitherto seen to it that the professional card is concealed. In doing so, they have provided greater security for the card.

Although this situation can be considered to be satisfactory, it raises a problem since, driven by the wish to obtain greater security for their data, certain professional persons have adopted the habit of removing these professional cards from the terminal, for example at the end of a day or the weekend. Indeed, these merchants and professionals rightly fear the theft of the terminal and therefore the theft of their professional cards.

These daily insertions and withdrawals, which are not initially planned by the terminal manufacturers, raise problems, related mainly to mechanical resistance and accessorily to problems of security. Indeed, the insertion and withdrawal of the professional card requires the dismantling of the flap situated on the front face of the terminal. Now this flap is generally fixed to the terminal by means of plastic clips. Since these clips are not designed to be in action several times a day, they end up getting broken or they make the terminal unusable. The adaptation of these clips to cope with daily stresses is a delicate problem. Besides, the opening and closing of this flap ultimately deforms the plastic, thus making the terminal subject to attacks, for example through the insertion of small-sized probes into the terminal.

4. SUMMARY OF THE INVENTION

A solution therefore needs to be proposed to this problem posed by the prior art terminals. The invention does not have the drawbacks of the prior art. More specifically, the invention relates to a flap intended to close a cavity of a terminal, comprising a memory card reader. According to the invention, said flap comprises at least one slot for inserting a memory card.

Thus, unlike in the prior-art flaps and terminals, it is not necessary to remove the flap from the terminal to be able to extract the professional card. It is enough to make the card slide outside the slot.

According to one particular embodiment, said slot is obtained by a difference in height between a base plane and an insertion plane and said slot has a guiding profile.

Thus, in this embodiment, the flap comprises a base plane and an insertion plane. Overall, the base plane is generally parallel to the insertion plane and a particular profile is cut out on the base plane at the level of the insertion slot. The same profile is cut out on the insertion plane. This enables the card to be guided when it is being inserted. According to one particular characteristic, this profile has an overall wave shape. Thus, guidance is ensured.

According to one particular embodiment, said flap has a base plane generally reproducing the shape of a portion of the rear face of a terminal intended to receive said flap and an insertion plane at least partially tilted at a predetermined angle relative to said base plane, said insertion plane defining said insertion slot.

Thus, the insertion slot is the result of a difference of tilt and/or positioning of two planes relative to each other.

The two embodiments referred to earlier can naturally be combined with each other. They can also be implemented independently.

According to one particular characteristic, said angle of tilt of the insertion plane relative to said base plane is determined as a function of the thickness of the card to be received in said insertion slot and the thickness of said base plane.

Thus, the thickness of the slot is precisely that needed for the insertion of the card and the difference of tilt enables the card to be guided. Indeed, it must be borne in mind that the card inserted into the slot is intended to be read by a reading device situated inside the terminal. It is therefore important to guide the card accurately towards this reader. The tilting and/or positioning of the two planes especially make it possible to carry out this guidance.

According to one particular characteristic, the width of said insertion plane is generally equal to the width of a card to be inserted into a reader of said terminal.

According to one particular characteristic, the length of said insertion plane is generally equal to the difference between the length of a card to be inserted into a reader of said terminal and the length necessary for connecting said card with a memory card connector situated in said terminal.

Thus, the card, once inserted into the flap, does not go beyond it.

According to one particular characteristic, the length of said insertion plane is smaller than the difference between the length of a card to be inserted into a reader of said terminal and the length necessary for connecting said card with a memory card connector situated in said terminal.

According to one particular characteristic, said flap furthermore comprises, on its front face, a card retaining zone taking the form of a wall resulting from a difference of positioning between said base plane and said plane of tilt.

Thus, this retention zone maintains the card in position when it is inserted into the slot (and therefore into the reader) and prevents the card from being stolen. Secondarily, this retention zone is particularly useful when the length of said insertion plane is slightly smaller than the difference between the length of a card to be inserted into the reader and the length needed for the connection of said card with a memory card connector situated in said reader: the card is thus locked and cannot be stolen since the edge of the card rests against this retention zone.

According to one particular characteristic, said base plane comprises, at said slot F, a cut-out line forming a notch. This notch can for example have a wave shape and enables the card to be guided during its insertion.

According to one specific characteristic, said flap furthermore comprises, on its front face, a hollow for extracting a card. Thus, this hollow makes it possible to pass the finger beneath the card and hence get free of the retention zone.

Thus, when this card is supported on said retention zone, this hollow for extracting makes it easier to extract the card.

5. FIGURES

Other features and advantages of the invention shall appear more clearly from the following description of a preferred embodiment given by way of an illustrative and non-exhaustive example and from the appended drawings, of which:

6. DETAILED DESCRIPTION

Figure 1:
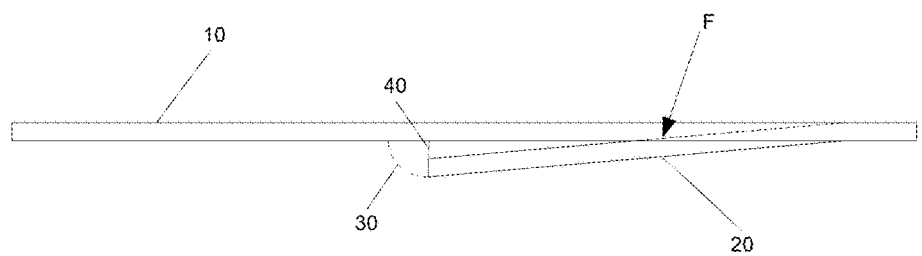
FIG. 1 is a longitudinal section of a simplified representation of a flap according to the invention.

6.1. Reminder of the Principle of the Invention

The invention relates to a flap positioned on the rear face of a terminal. This flap enables the insertion of a card, more particularly a professional card, into the terminal. This flap can advantageously be mounted on an existing terminal instead of the existing flap. It then makes it possible to modify the terminal at low cost and resolve the problems mentioned (see here above). This flap can also be mounted on novel terminals. The object of this flap is to stop the professional person from having to dismantle it in order to insert and extract his professional card while continuing to offer guarantees of security against the removal of the professional card by a malicious person. The flap is specifically designed so that the insertion or withdrawal of the professional card is easy when the terminal is turned over (i.e. when the rear face of the terminal faces the professional person wishing to insert or withdraw the card).

The flap is specifically designed so that the insertion or withdrawal of the professional card is complicated when the terminal is in a position of use (i.e. when the front face of the terminal has to face the user, for example a patient or customer wishing to use the terminal to make a transaction). To this end, the direction of withdrawal of the card is reversed relative to the direction of use of the terminal and, according to one particular characteristic, it comprises a retention stop. More particularly, the terminal in its position of use faces the user. It generally comprises a screen and a keypad. It can possibly comprise a certain number of memory card reader devices (smartcard reader, magnetic card reader, contactless reader) that can be used to identify or authenticate a user and/or make transactions. As a rule, such a terminal is designed to be held in one hand by the user while his other hand carries out the requested operation (for example the entry of a pin code). According to the invention, the flap is positioned beneath the terminal and it is shaped in order to prevent the user from withdrawing the professional card when the terminal is held in the hand. In one embodiment of the invention, this is done by making sure the card can be extracted only by a movement of translation towards the rear of the terminal, this movement being impossible with the hand holding the terminal although this hand is partly in contact with the professional card. This embodiment shall be presented here below.

In other embodiments, (partial or non-partial) concealment devices for concealing the portion of the card that is outside the terminal can be used. Such devices also fulfill the function of preventing the withdrawal of the card. However, they have to be added to the flap and this can cause problems either of manufacture or of cost. Among the devices envisaged, there are for example shutters (or other adapted fastening devices) which prevent the user from sensing the presence of the card in his palm.

The flap is therefore designed generally as an intersection of two planes: a base plane and an insertion plane. The insertion plane is tilted relative to the base plane. The size of the insertion plane is adapted to the size of the card. If it is a smartcard, the size of the insertion plane is adapted to this type of card (for example under the ISO IEC 7816-1 standard). More particularly, the size of the insertion plane is adapted to the part of the card that is not in the terminal. Besides, the tilt of the insertion plane is computed firstly according to the position of the card reader in the terminal and secondly according to the thickness of the base plane in order to have available an insertion slot whose height is substantially equal to the thickness of the card (for example according to the ISO IEC 7816-1 standard).

Figure 2:
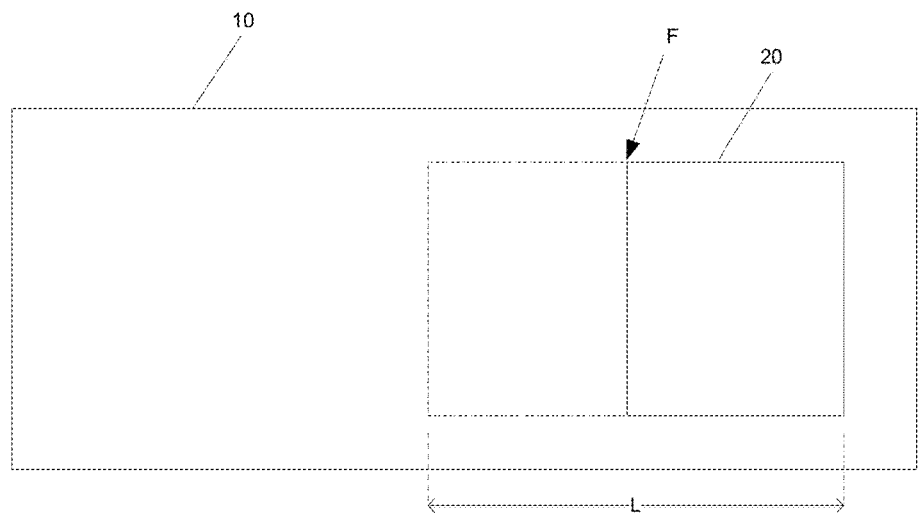
FIG. 2 is a top view of a simplified representation of the flap of FIG. 1.
Figure 3:
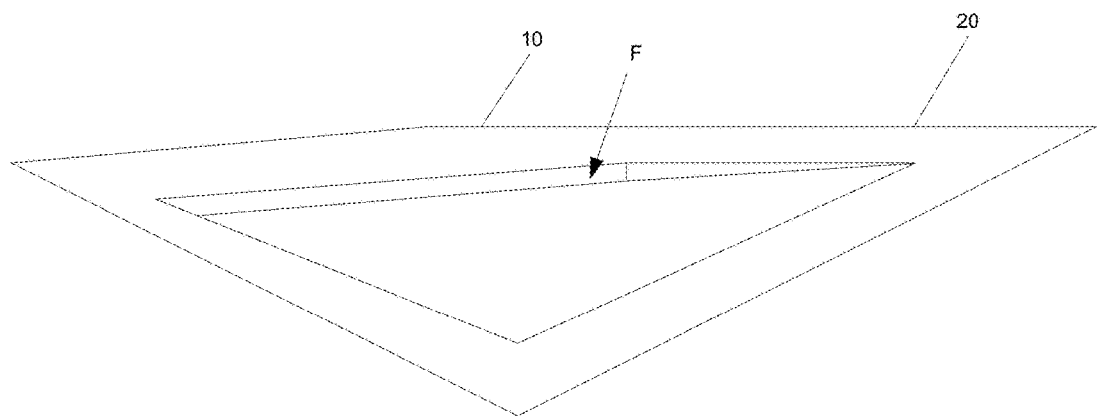
FIG. 3 is a simplified 3D representation of the flap of FIG. 1.

A drawing of a general embodiment of the flap according to the invention is presented with reference to FIGS. 1, 2 and 3 in which only the above-described characteristics are included (the other characteristics of the flap such as the fastening systems and the gripping points are not shown for reasons of greater legibility). The flap comprises a base plane 10, an insertion plane 20 (the length L of which varies according to the embodiments). The non-visible part of the insertion plane is illustrated in dotted lines. In certain embodiments, the insertion plane is not extended beneath the base plane. The insertion plane is tilted relative to the base plane by an angle 30 making it possible to define the height 40 of the slot F, generally corresponding to the thickness of the card.

6.2. Description of One Embodiment

Figure 4:
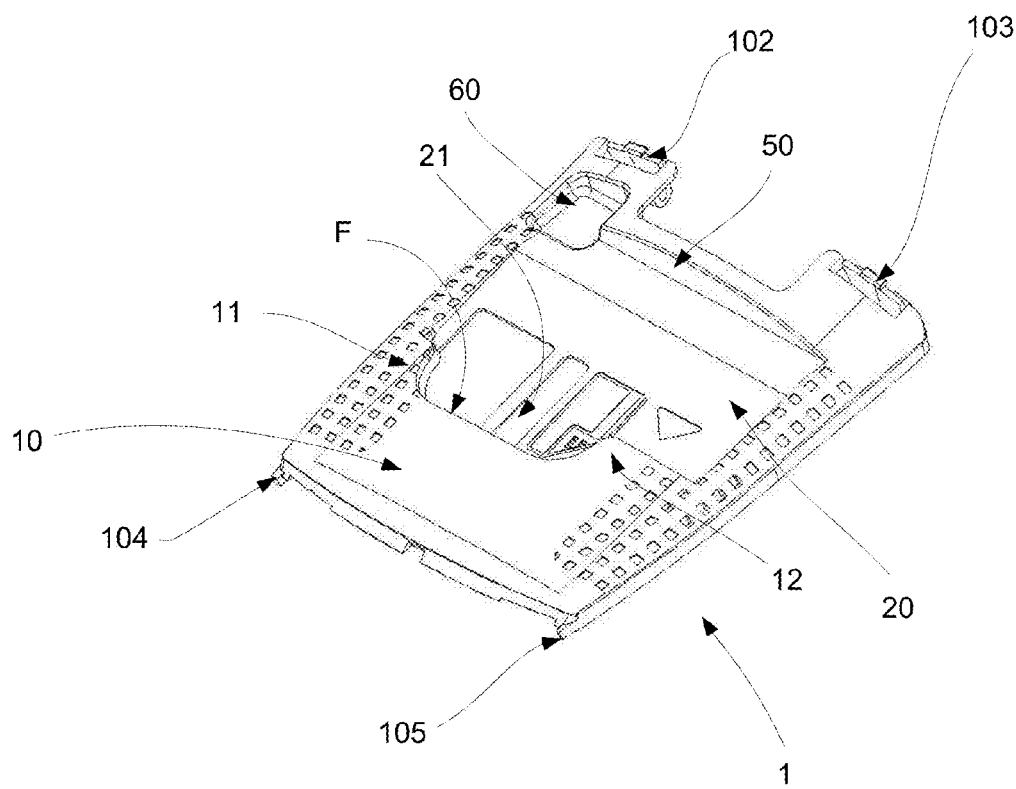
FIG. 4 is a 3D representation of the front or external face of the flap in this embodiment (rear face of the terminal)
Figure 5:
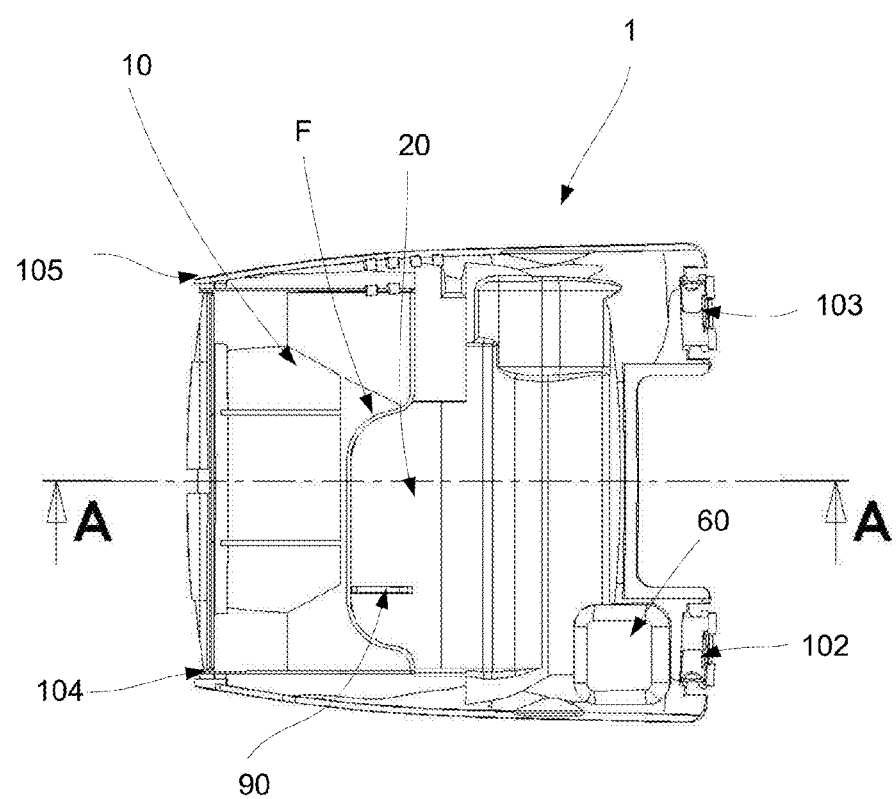
FIG. 5 is a plan view of the rear face or interior face of the flap.
Figure 6:
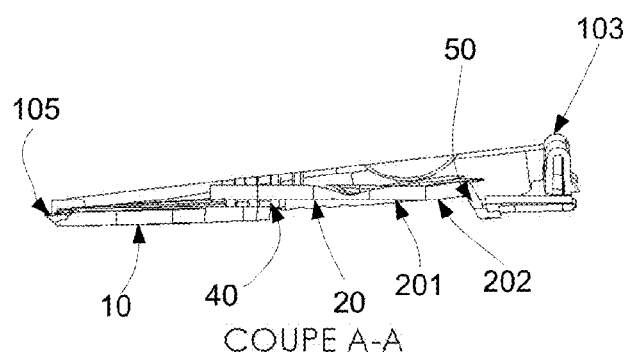
FIG. 6 is a view in section along the section A-A of FIG. 5.
Figure 7:
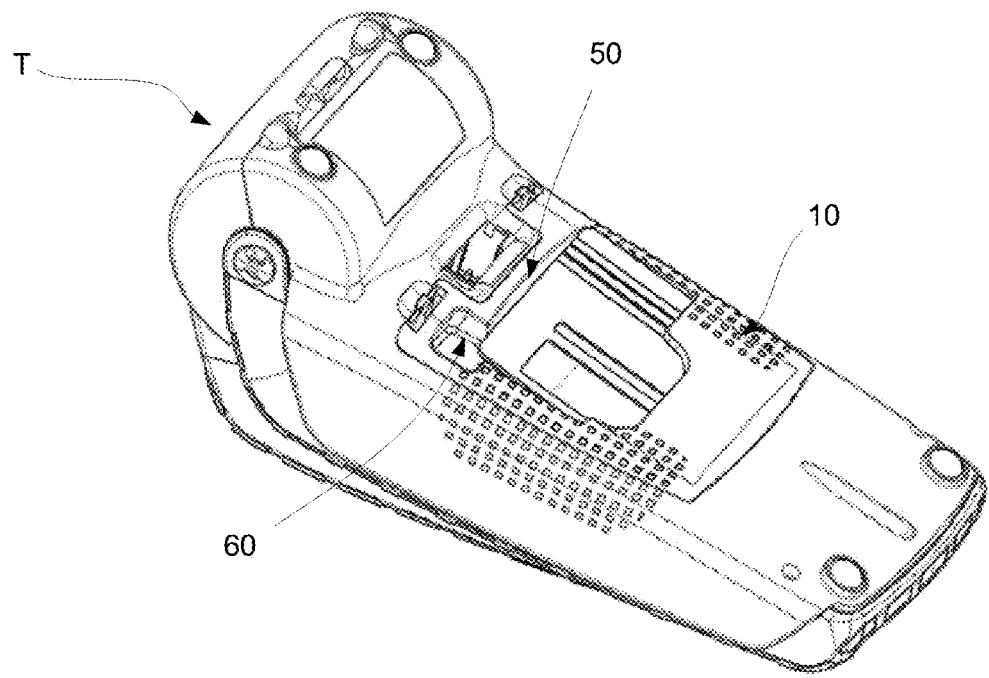
FIG. 7 is a 3D representation of the rear face of the terminal on which the flap according to the invention is mounted.
Figure 8:
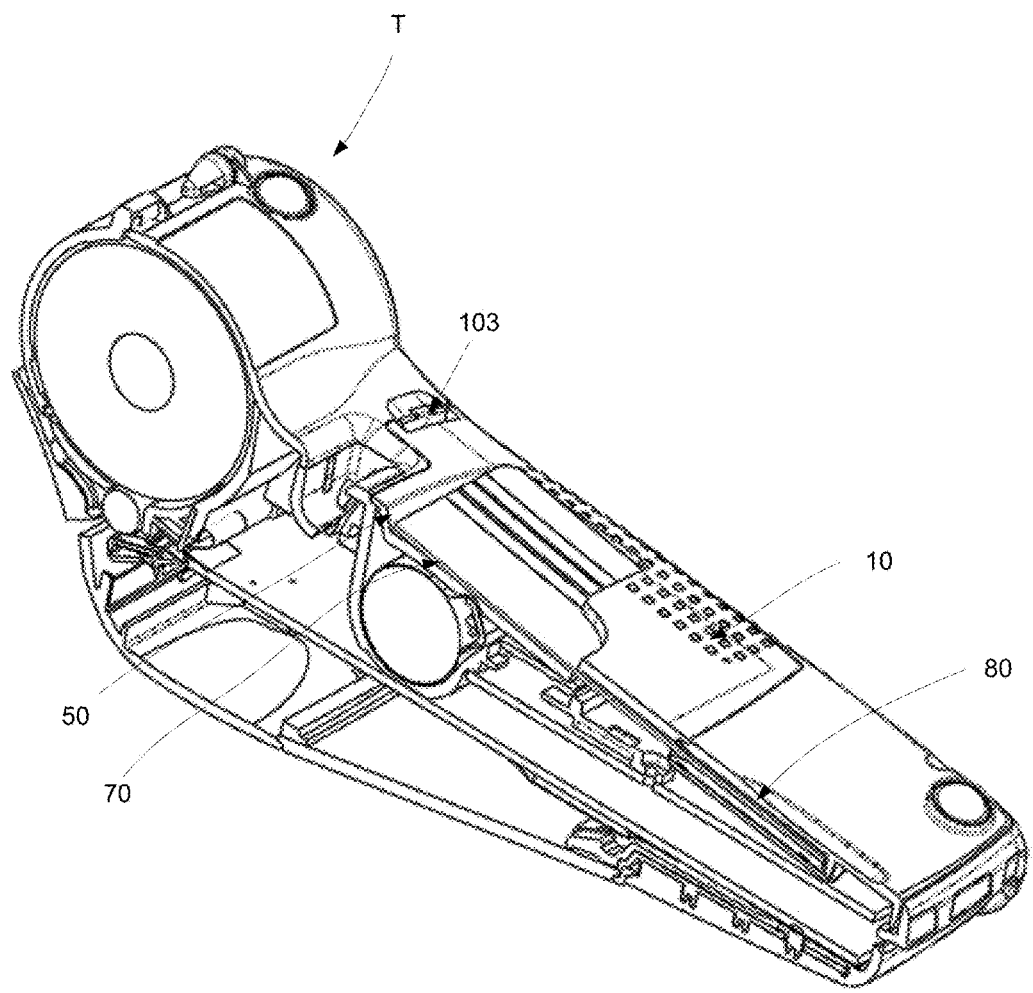
FIG. 8 is a partially exploded view of the terminal and the flap shown in FIG. 7.
Figure 9:
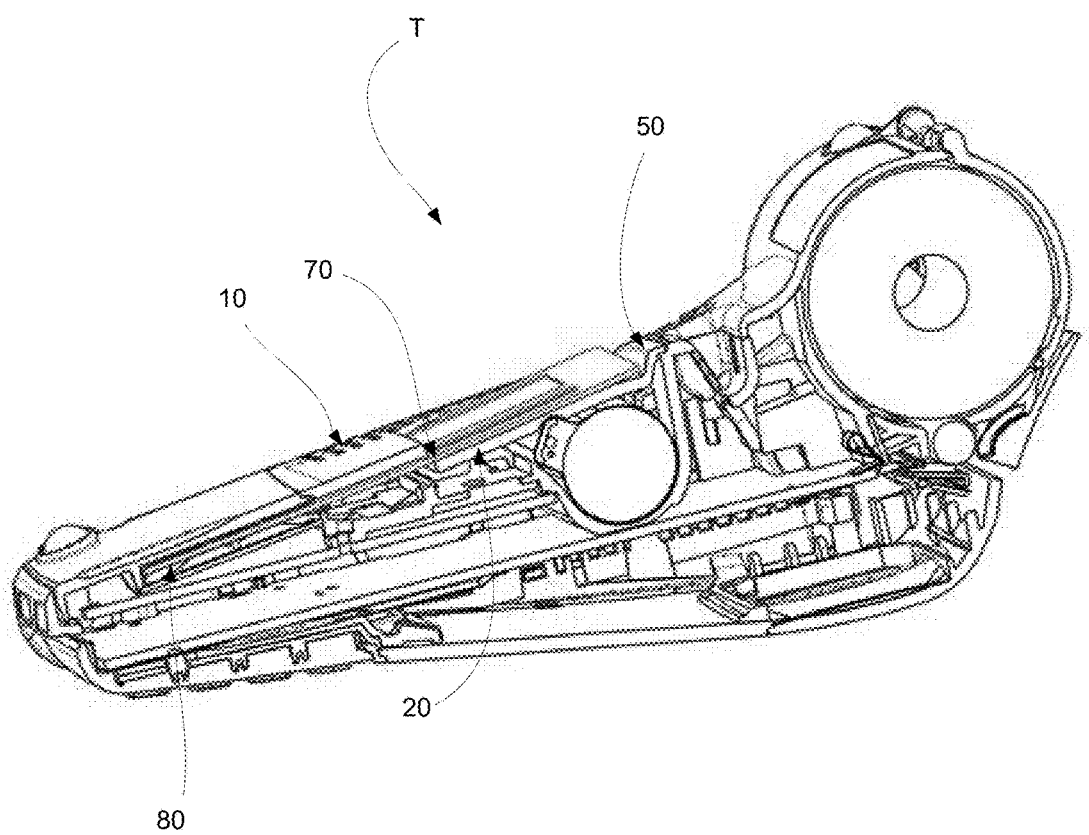
FIG. 9 is a partial view of the same terminal.

Referring to FIGS. 4 to 9, we present a particular embodiment of the flap that is an object of the invention. In FIGS. 4 to 6, the flap is represented alone. In FIGS. 7 to 9, the flap is represented when it is fitted to into a payment terminal.

FIG. 4 is a 3D representation of the front face of the flap in this embodiment. FIG. 5 is a plan view of the rear face or interior face of the flap. FIG. 6 is a view in section, along the section A-A of FIG. 5. FIG. 7 is a representation in three dimensions of the rear face of the terminal on which the flap that is the object of the invention is mounted. FIG. 8 is a partially exploded view of the terminal and of the flap represented in FIG. 7. FIG. 9 is also a partially exploded view of the terminal and of the flap represented in FIG. 7.

FIGS. 4 to 9 represent an embodiment of the flap in which the base plane 10 is slightly domed. The domed shape of the base plane is adapted to the shape of the terminal T to which the flap is adjoined. In this embodiment, the flap 1 comprises two clips 102, 103 which enable the flap to be fixed into receiving elements provided for this purpose in the terminal T. The flap also comprises two tenons 104, 105 serving to position the flap in two corresponding housings of the terminal (not shown). As explained here above, the flap also comprises an insertion plane 20. This insertion plane is tilted by a given angle relative to the base plane. The base plane defines the slot F having a predetermined height 40 and a wave-shaped profile. According to the invention, the insertion plane 40 has a variable tilt 201, 202. This variable tilt relative to the base plane 10 makes it possible, when a card is inserted, to impart a curve to this card (reference 70, FIGS. 8 and 9) which has the effect of placing the card in a state of tension against the card retention zone 50. In the embodiment presented, the card retention zone is constituted by the junction wall between the base plane and the insertion plane as can be seen in FIG. 4. The variable tilt also guides the card, during its insertion, towards its destination (which is the smartcard reader (reference 80, FIGS. 8 and 9).

According to the invention, the flap also integrates an extraction hollow 60. This extraction hollow, which takes the form of a hole or a generally parallelepiped-shaped recess, makes it possible, as shown in FIG. 8 for example, to lift the smart card when it is inserted into the reader.

According to the invention, in this embodiment, the shape of the cut-out portion of the slot F is also special; in this embodiment, the slot is generally wave-shaped. More particularly, the base plane comprises, at said slot F, a cut-out line forming a notch and having the general shape of a wave. Other shapes can also be adopted. This shape provides for optimal guidance of the card when it is inserted into the reader. Indeed, as will be understood from reading the figure, the card is supported on the central part (21) of the insertion plane while the left-hand and right-hand ends of the card are guided beneath the base plane (by the sides 11 and 12 of the base plane). To ensure that the insertion plane is not deformed by the force exerted during the insertion, the flap comprises, beneath the insertion plane, a support rib 90. This rib rests on one or more components or elements situated in the terminal. Since the left-hand and right-hand edges of the card are guided, it is not possible to insert the card in a wrong position.

In a complementary way, the shape of the slot can be defined according to other particular constraints, which for example can be related to the weight of the part (for example to save on plastic material).

Thus, in this embodiment of the invention, it is possible, on the one hand, to specifically manufacture terminals so that they can receive a professional card but, on the other hand, to replace an existing terminal flap by a new flap such as that of the invention.

Although the present disclosure has been described with reference to one or more examples, workers skilled in the art will recognize that changes may be made in form and detail without departing from the scope of the disclosure and/or the appended claims.

The invention claimed is:

1. An apparatus comprising:
   a memory card reader; and
   a flap for concealing a cavity of said apparatus, wherein the flap comprises:
   at least one slot for inserting a memory card, wherein said slot is obtained by a difference in height between a base plane and an insertion plane,
      wherein said base plane generally reproduces the shape of a portion of a rear face of the apparatus and comprises an opening forming the slot above the insertion plane for inserting the memory card, and
      wherein the insertion plane is at least partially tilted at a predetermined, fixed angle relative to the base plane and extends below the base plane.

2. The apparatus according to claim 1, wherein said slot has a guiding profile.

3. The apparatus according to claim 1, wherein said angle of tilt of said insertion plane relative to said base plane is determined as a function of the thickness of the card to be received in said insertion slot and the thickness of said base plane.

4. The apparatus according to claim 1, wherein the width of said insertion plane is generally equal to the width of a card to be inserted into a reader of said terminal.

5. The apparatus according to claim 1, wherein the length of said insertion plane is generally equal to the difference between the length of a card to be inserted into a reader of said terminal and the length necessary for connecting said card with a memory card connector situated in said terminal.

6. The apparatus according to claim 1, wherein the length of said insertion plane is smaller than the difference between the length of a card to be inserted into a reader of said terminal and the length necessary for connecting said card with a memory card connector situated in said terminal.

7. The apparatus according to claim 1, further comprising, on its front face, a card retaining zone taking the form of a wall resulting from a difference of positioning between said base plane and said plane of tilt.

8. The apparatus according to claim 1, further comprising, on its front face, a hollow for extracting a card.

9. The apparatus according to claim 1, wherein said base plane comprises, at said slot, a cut-out line forming a notch.

10. A terminal comprising:
   a cavity;
   a memory card reader; and
   a flap for concealing the cavity of the terminal, wherein the flap comprises at least one slot for inserting a memory card,
      wherein said slot is obtained by a difference in height between a base plane and an insertion plane,
      wherein said base plane generally reproduces the shape of a portion of a rear face of the terminal and comprises an opening forming the slot above the insertion plane for inserting the memory card, and
      wherein the insertion plane is at least partially tilted at a predetermined, fixed angle relative to the base plane and extends below the base plane.

* * * * *